Patented Nov. 27, 1934

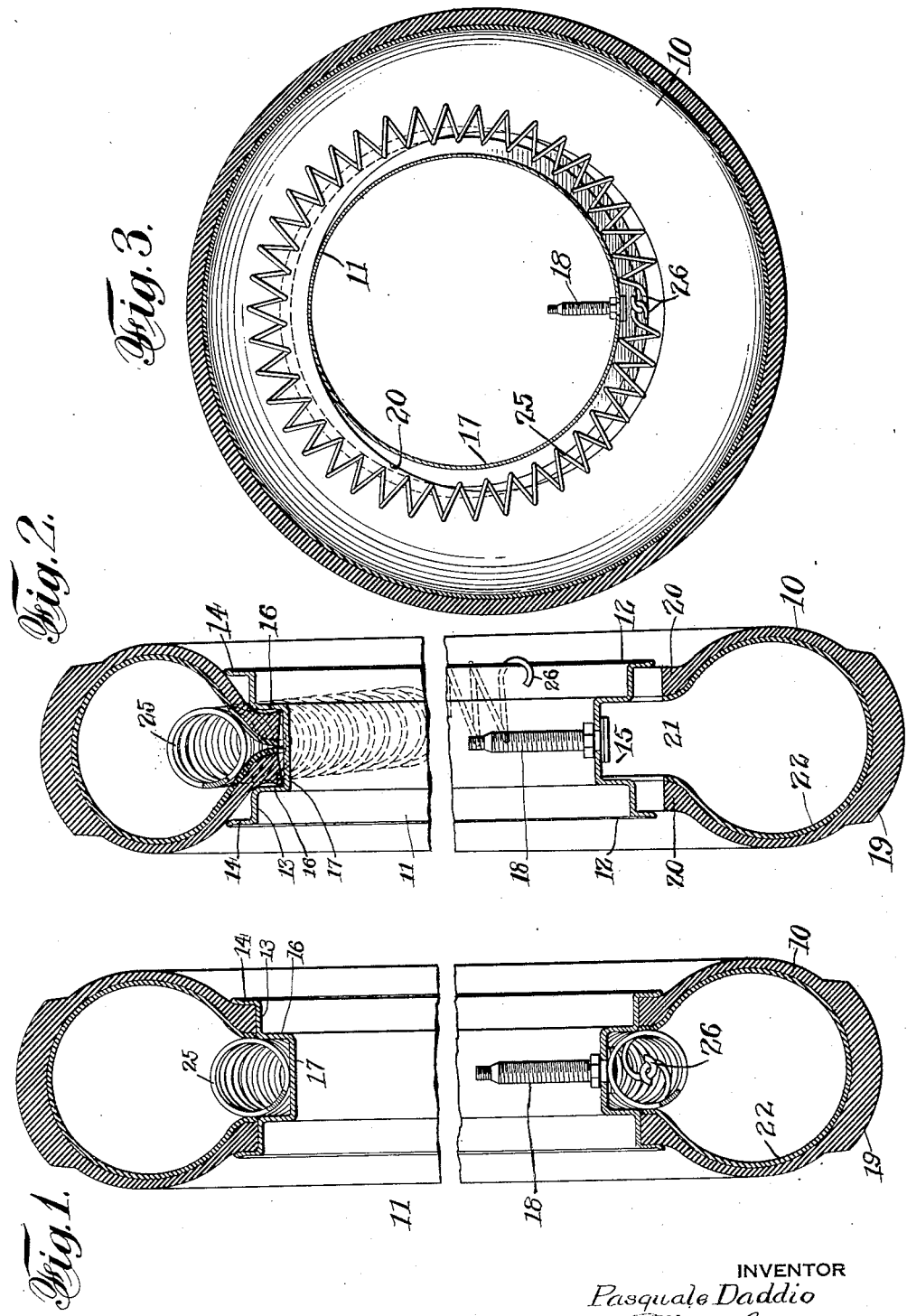

1,982,135

UNITED STATES PATENT OFFICE 1,982,135

PNEUMATIC TIRE

Pasquale Daddio, New York, N. Y.

Application July 5, 1932, Serial No. 620,829

6 Claims. (Cl. 152—20)

This invention relates to improvements in a vehicle tire such as are applied on automobiles.

One of the principal objects is to provide means whereby a hole or opening in the shoe of the tire, caused by a puncture will automatically close itself at the interior of the shoe.

Another object is to provide a novel feature to maintain an airtight connection between the shoe of the tire and the rim.

Other objects and advantages embraced by this invention will be pointed out more fully in the following specification.

In the drawing, Fig. 1 is a cross-sectional front view of a vehicle tire completely assembled.

Fig. 2 is a cross-sectional front view of a vehicle tire partially assembled.

Fig. 3 is a cross-sectional side view of a vehicle tire, partially but more completely assembled than the tire shown in Figure 2.

Throughout the views the same reference numerals apply to corresponding parts.

In the drawing the vehicle tire illustrated, comprises two main elements, which are the conventional tire casing or shoe 10 and the rim or frame wheel 11 to which casing or shoe 10 is mounted.

A cross-section of frame wheel 11 discloses two outer angular shelves or supports 12 comprising each a horizontal seat 13 with a flange 14 preferably at right angles to said seat.

Between both shelves 12 is located a cavity formed by a circular groove 15 of said wheel, having two side walls 16 and a bottom wall 17. The latter rests on the rim of the spoked wheel of the vehicle, not shown. While the side walls 16 are shown at right angles to seats 13, it is understood that their angularity may differ. To bottom wall 17 is fastened a conventional air valve 18. Such rim is commonly known as a drop center rim and alone forms no part of the present invention.

Shoe 10 is provided with a thickened tread 19 at its outer circumference and two supporting beads 20 at its inner circumference, shoe 10 is open throughout its length at its inner circumference, the width of the opening 21 being approximately the same as the width of groove 15. The width of each bead 20 is approximately the same as the width of shelves 12 in which the beads are held when the shoe is assembled with frame wheel 11.

The entire inner surfaces of shoe 10 and bead 20 are covered with an inner tube 22 which is also open in its total length at its inner circumference, similar to shoe 10.

This inner tube 22 comprises a layer of soft rubber which is vulcanized or otherwise attached to the inner surfaces of the shoe and beads and serves the purpose of automatically closing a pierced opening in the shoe when the puncturing element is removed, and thus prevent the compressed air in the tire from escaping. When shoe 10 is assembled with frame wheel 11 as shown in Fig. 1, beads 20 are resting against seats 13 with a certain amount of pressure, so as to make the chamber which is formed by the shoe and frame wheel, comparatively air tight. In order however to provide a chamber which will return the high air pressure required by automobile tires, I employ an annular pressure element in form of a spiral spring 25, having end hooks 26. This spring, in its normal condition, is hooked together at its ends and caused to circumpose bottom wall 17 while under comparatively high tension. The outside diameter of the coils of spring 25 are larger than the width of the opening 21, so that the coils of the spring will press against the layer of soft rubber on the inner surfaces of the beads and press this rubber with the rims in opposite directions against the flanges 14 of the frame wheel, thus sealing the latter with the shoe, and insure a perfectly airtight chamber, secure against any detrimental effects, such as caused by a side pressure on the side walls of the shoe or similar sources to displace the beads.

If desirable, a liquid curing substance may be placed within the tire, to assure an additional closing or healing of pierced openings of the soft rubber, but is not absolutely essential however.

To assemble the shoe with the frame wheel, the operator will proceed as follows:

He will first enter the spiral spring into the shoe, then hook both ends of the spring onto one of the beads 20 and slip parts of the circular beads 20 into groove 15 as shown in Fig. 2. This places the opposite parts of the beads of the shoe a corresponding distance away from the outer frame part of the wheel 11, so that the operator is enabled to push this unopposed part of the shoe to one side, take a hold of both ends of the spring, join them and then insert the united parts into the shoe, draw that part of beads 20 which had been placed into groove 15, in a direction away from the center of the wheel and cause the rims to take their natural position in relation to the rim of wheel 11. This will cause the complete spring to snap into groove 15, circumpose the latter and at the same time cause a side pressure on both beads in a manner already described.

While I have shown a spring with circularly formed coils, it is nevertheless understood that they may also have a triangular or other formation if so desired, so as to assure an effective side pressure on the beads of the shoe.

While I have shown and described my invention in the manner disclosed it is therefore understood, that I may make such changes and modifications as would occur to one skilled in the art to which this invention relates and without however departing from the spirit of my invention.

What I claim, is:

1. A vehicle tire, comprising a drop center rim, a tire shoe open at its inner circumference, and having supporting beads, said beads to oppose the respective outer seats of said rim, a spiral spring circumposing the bottom of the drop center well, said spring comprising a ring of diameter smaller than the diameter of the bottom of said well, means to unite or disassemble the end parts of said spring only while the tire is deflated, said spring being normally located between said supporting beads of said shoe to press said beads in opposite directions and against said outer seats to cause said shoe and rim to form an air tight chamber and an air valve mounted to said rim to lead to said chamber.

2. The combination with a vehicle tire rim of the drop center type, of a pneumatic tire, a tire valve secured to said drop center rim and a coil spring comprising a pressure element located between the beads of said tire and circumjacent the rim to cause said beads and rim to form an air tight chamber, said pressure element comprising a ring of smaller diameter than the diameter of the bottom of the drop centre.

3. A vehicle tire comprising the combination with a drop center rim and a tire carcass, of a spiral spring circumposing the drop center of the rim and constituting a ring of lesser diameter than the diameter of the bottom of the drop center, said spring being disposed between the beads of the tire carcass to press the beads against the flanges of the rim to produce an air seal between the rim and the tire beads, a tire valve mounted directly onto the drop center rim, and means to separably connect the ends of the spring, only when the tire is deflated.

4. A vehicle tire comprising the combination with a drop center rim and a tire carcass, of means adapted to be disposed in the drop center of the rim to cause the beads of the tire to engage the flanges of the rim when the tire is deflated to produce an air seal therewith, and a tire valve mounted directly onto the drop center rim.

5. A vehicle tire comprising the combination with a drop center rim, of a tire carcass, a coil spring disposed in the drop center of the rim to cause the beads of the tire to engage the flanges of the rim to produce an air seal therewith at least when the tire is deflated, a detachable securing means for the ends of the coil spring operable only while the tire is deflated, and a tire valve mounted directly onto the drop center rim.

6. A vehicle tire comprising the combination with a drop center rim and a tire carcass, of a spiral spring circumposing the drop center of the rim, interconnecting hooks on each end of the spring to unite or disassemble the end parts of the spring only while the tire is deflated, said spring being located between said supporting beads of said carcass, to press said beads in opposite directions and against the flanges of the rim to produce an air seal between the rim and the tire beads.

PASQUALE DADDIO.